(12) United States Patent
Chen

(10) Patent No.: US 6,433,312 B1
(45) Date of Patent: *Aug. 13, 2002

(54) ELECTRIC ROASTER

(75) Inventor: Chung-Che Chen, Tainan (TW)

(73) Assignee: Hamilton Beach/Proctor-Silex, Inc., Glen Allen, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/448,855

(22) Filed: Nov. 23, 1999

(51) Int. Cl.$^7$ .............................. F24C 7/10; F27D 11/00
(52) U.S. Cl. ......................................... 219/386; 99/332
(58) Field of Search ............................... 219/524, 386, 219/387, 464, 525, 452.13; 99/379, 426, 391, 425, 341, 332, 339, 331, 551, 375, 374

(56) References Cited

U.S. PATENT DOCUMENTS

| | | |
|---|---|---|
| 2,040,369 A | 5/1936 | Fischer |
| 2,176,855 A | 10/1939 | Gough |
| 2,765,727 A | 10/1956 | Lipsich et al. |
| 2,899,888 A | 8/1959 | Koci |
| 3,746,837 A * | 7/1973 | Frey et al. ................. 219/387 |
| 3,848,110 A * | 11/1974 | Giguere et al. ............. 219/525 |
| 3,998,145 A * | 12/1976 | Maisch ........................ 99/339 |
| 4,088,067 A * | 5/1978 | Kaebitzsch et al. ........... 99/379 |
| 4,173,179 A * | 11/1979 | Arthur .......................... 99/374 |
| 4,178,500 A * | 12/1979 | Brindopke ................. 219/524 |
| 4,662,273 A * | 5/1987 | Marchioni ..................... 99/426 |
| 4,700,051 A * | 10/1987 | Goessler et al. ........... 219/464 |
| 4,987,827 A * | 1/1991 | Marquez ...................... 99/331 |
| 5,181,455 A * | 1/1993 | Masel et al. ................. 99/391 |
| 5,615,604 A * | 4/1997 | Chenglin ..................... 99/332 |
| 5,619,907 A * | 4/1997 | Orgelmacher ................ 99/551 |
| 5,845,562 A * | 12/1998 | Deni et al. .................... 99/375 |
| 5,884,555 A * | 3/1999 | Chang ......................... 99/425 |
| 6,016,741 A * | 1/2000 | Tsai et al. .................... 99/341 |
| 6,024,014 A * | 2/2000 | Kasai .......................... 99/425 |
| 6,062,130 A * | 5/2000 | Brady ......................... 99/332 |
| 6,064,042 A * | 5/2000 | Glucksman et al. ... 219/452.13 |
| 6,170,389 B1 | 1/2001 | Brady ......................... 99/332 |
| 2001/0018868 A1 * | 9/2001 | Brady ......................... 99/332 |

FOREIGN PATENT DOCUMENTS

| | | | |
|---|---|---|---|
| JP | 406327572 | * 11/1994 | ........... A47C/37/06 |
| TW | 88209584 | 5/1999 | |

OTHER PUBLICATIONS

Copy of U.S. patent application Ser. No. 09/351,731, now abandoned.

* cited by examiner

Primary Examiner—Teresa Walberg
Assistant Examiner—Leonid Fastovsky
(74) Attorney, Agent, or Firm—Roger S. Dybvig

(57) ABSTRACT

An electric roaster has a base housing which includes a first roaster tray mounted thereon, and a first heating element attached to a bottom side of the first roaster tray. The first roaster tray includes a surface slanting downward in a first direction from one side to the other side of the first roaster tray, and an oil collecting hole formed in the first roaster tray adjacent the other side of the first roaster tray. A collecting receptacle is disposed in the base housing below the oil collecting hole. A cover housing includes a second roaster tray mounted therein. One of the cover housing and the second roaster tray is connected pivotally to one of the base housing and the first roaster tray so that the first roaster tray is covered by the second roaster tray when the cover housing is turned to cover the base housing. The second roaster tray includes a surface slanting downward in a second direction parallel to the first direction to an indented part, and an oil spout communicated with the indented part and extending into the base housing to communicate with the collecting receptacle.

17 Claims, 6 Drawing Sheets

ELECTRIC ROASTER

BACKGROUND OF THE INVENTION

1. Field of the Invention

The invention relates to an electric roaster, particularly to one having two roaster trays mounted respectively on a base and a cover which are connected pivotally together.

2. Description of the Related Art

FIG. 1 shows an electric roaster 1 of the above-described type which includes a base 10 supporting a rectangular roaster tray 12 and a cover 20 holding another rectangular roaster tray 22. The roaster tray 12 has an oil-collecting hole 121 adjacent to one side thereof, a plurality of parallel ribs confining grooves 122, and an upwardly and laterally extending rim 123. The surface of the roaster tray 12 is slanted downward to the oil-collecting hole 121. A heating element 13 is attached to the roaster tray 12 at the bottom side thereof, and an oil-collecting receptacle 14 is provided below the hole 121 of the roaster tray 12 so as to collect the liquids such as oil and water, released from the food roasted on the roaster tray 12.

The roaster tray 22 is also formed with a plurality of parallel grooves 221 and a rectangular rim 222. In use, food is placed on the roaster tray 12 and the cover 20 is turned to the base 10 to close the roaster tray 12 with the roaster tray 22. The rim 222 of the roaster tray 22 extends outwardly of the rim 123 of the roaster tray 12 when the roaster tray 12 is closed so that an enclosed space is formed between the roaster trays 12 and 22 for heating the food. The heating element 13 is energized by turning on a control unit 110 incorporating a timing device and mounted on the base 10.

A disadvantage encountered in the aforesaid conventional roaster is that the roaster tray 22 cannot be used individually for roasting food as it is not provided with any means for heating and for collecting liquid released from roasted food. After the roasted tray 22 is open and turned away from the roaster tray 12 upon completion of roasting, the liquids, such as oil and water, emitted from the roasted food is accumulated in an indented part of the roaster tray 22 and has to be removed therefrom by rubbing off with a piece of oil absorbing cloth or tilting the roaster to cause the liquid to flow out. To clean the roaster tray 22 in such a manner is inconvenient.

SUMMARY OF THE INVENTION

An object of the present invention is to provide a roaster of the above-mentioned type with an improved arrangement by which a roaster tray mounted on a cover of the roaster can perform a roasting operation independently of a roaster tray supported on a base housing and by which the liquids produced in the roaster trays held by both the base housing and the cover can be removed conveniently.

According to the present invention, an electric roaster comprises a base housing including a first roaster tray mounted thereon, and a first heating element attached to a bottom side of the first roaster tray. The first roaster tray includes a surface slanting downward in a first direction from one end to the other end of the first roaster tray, and an oil collecting hole formed in the first roaster tray adjacent to the other end of the first roaster tray. A collecting receptacle is disposed in the base housing below the oil collecting hole. A cover housing includes a second roaster tray mounted herein. One of the cover housing and the second roaster tray is connected pivotally to one of the base housing and the first roaster tray so that the first roaster tray is covered by the second roaster tray when the cover housing is turned to cover the base housing. The second roaster tray includes a surface slanting downward in a second direction parallel to the first direction from one end to the other end of the second roaster tray, an indented part disposed adjacent the other end of the second roaster tray, and an oil spout communicated with the indented part and extending into the base housing to communicate with the collecting receptacle.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
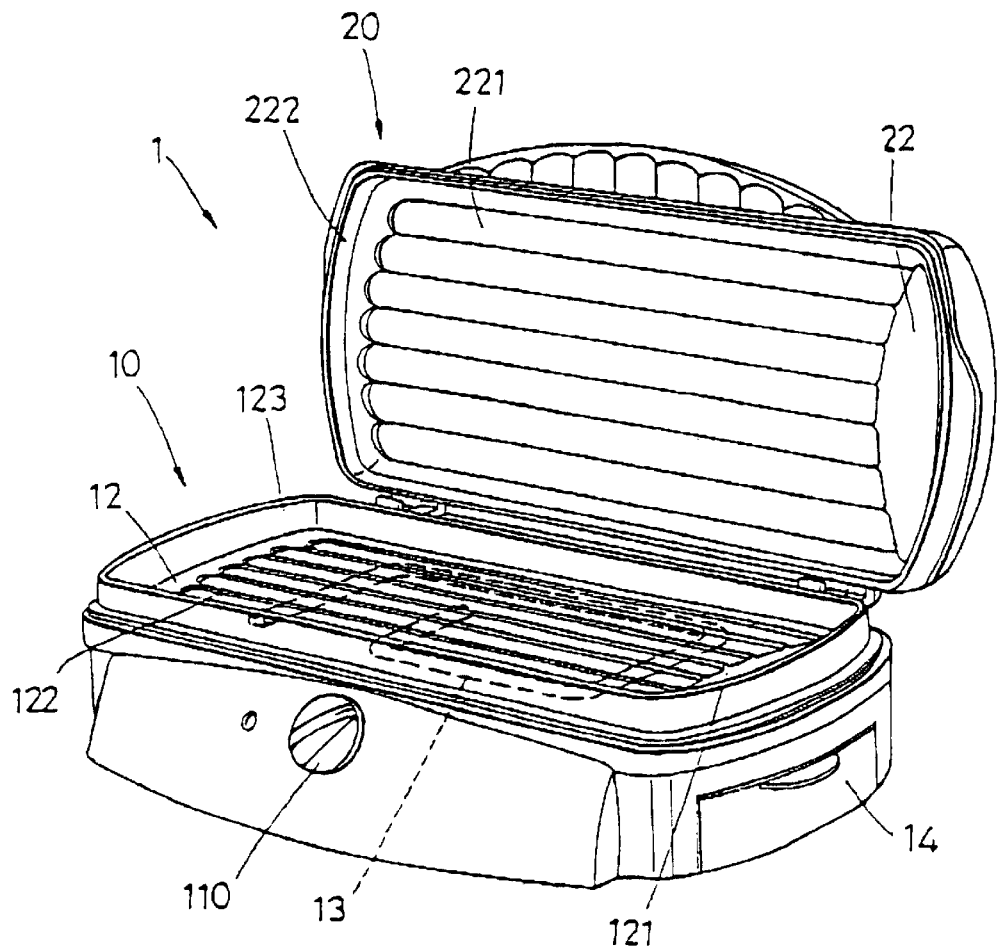
FIG. 1 shows a conventional electric roaster.
Figure 2:
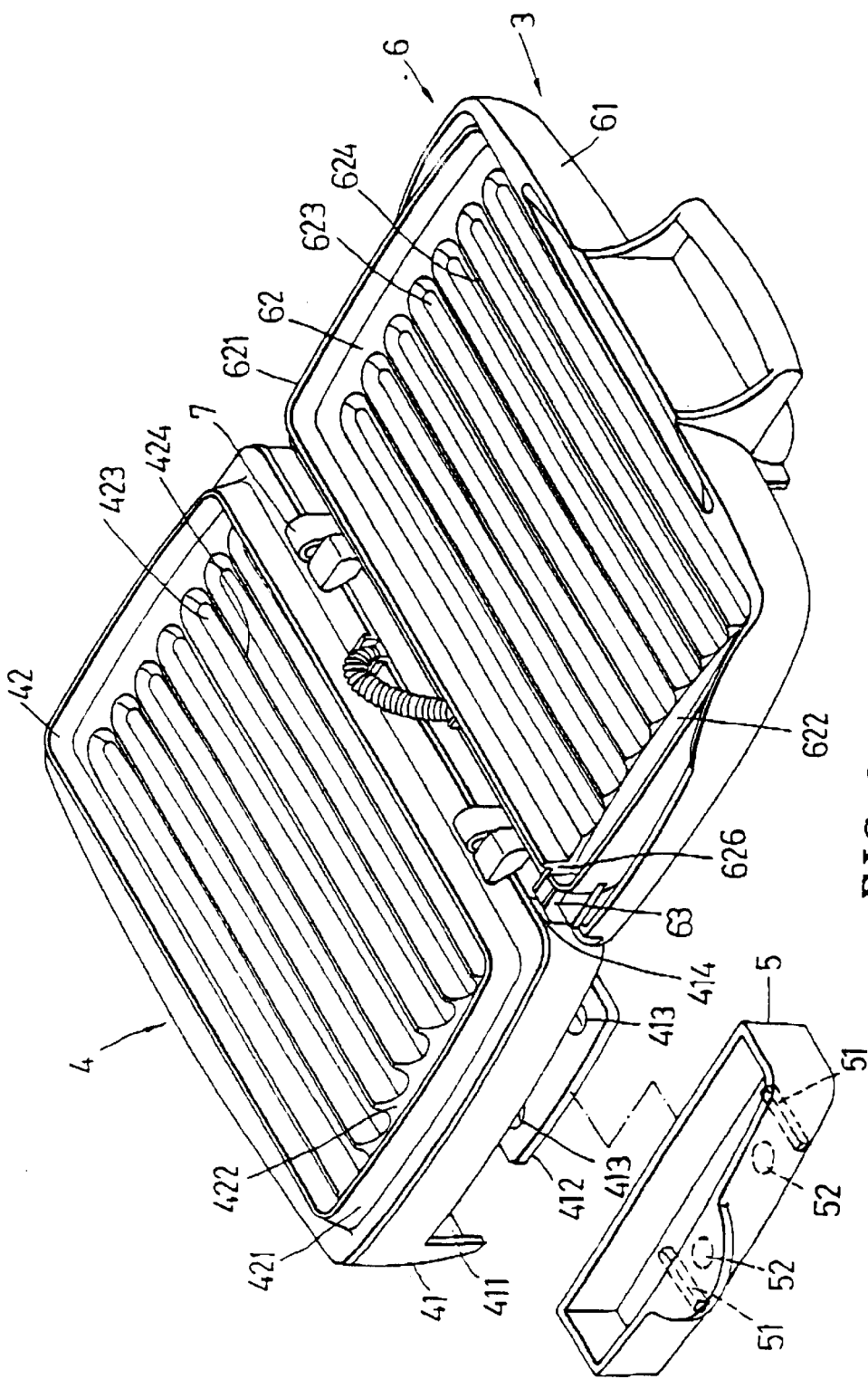
FIG. 2 is a perspective view of an electric roaster embodying the present invention.
Figure 3:
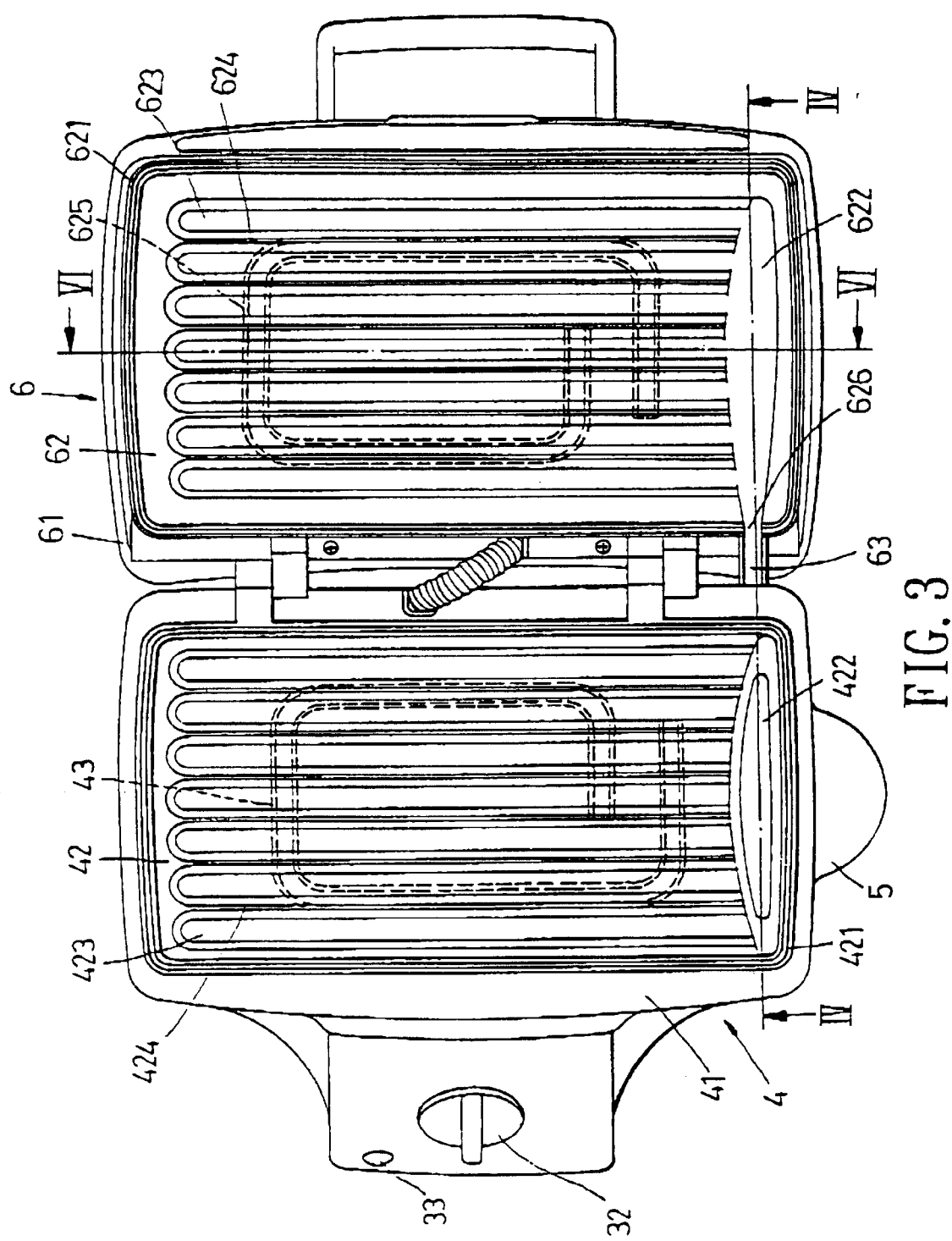
FIG. 3 is a top plan view of the electric roaster of FIG. 2.
Figure 4:
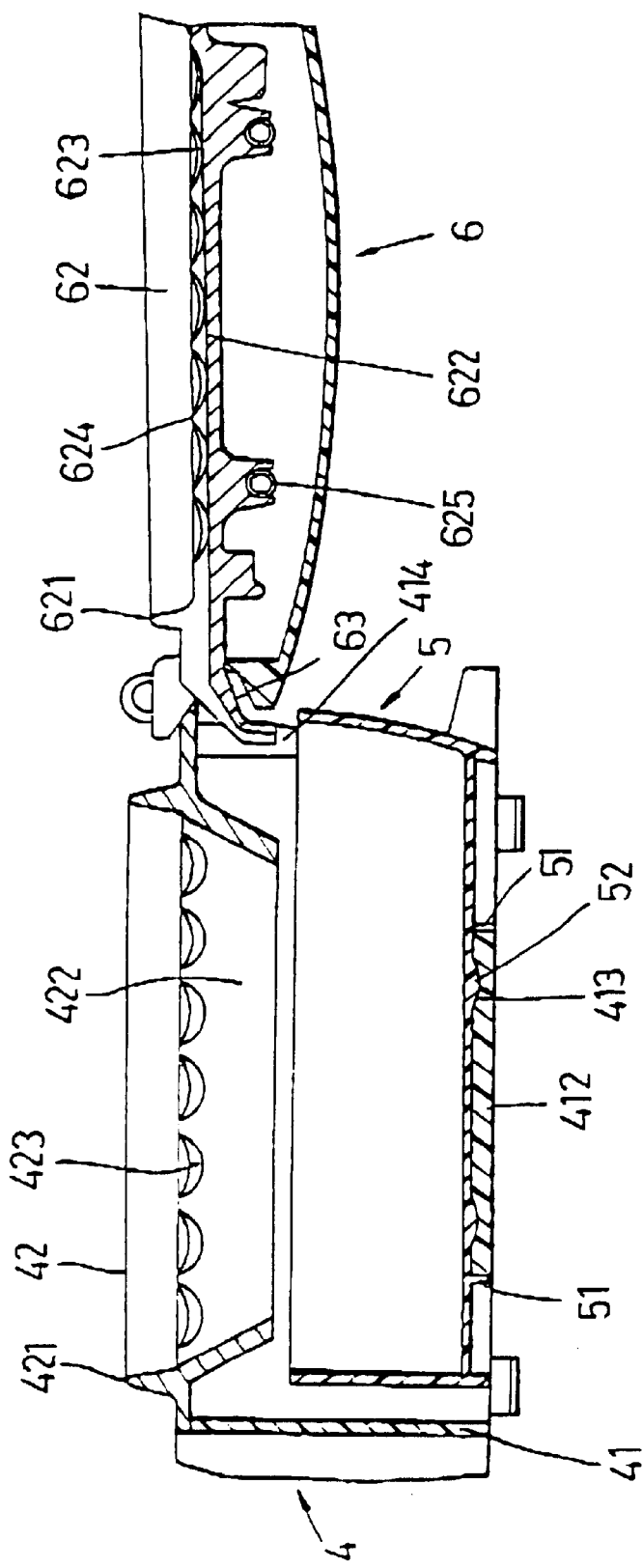
FIG. 4 is a sectional view taken along line IV—IV of FIG. 3.

Referring to FIGS. 2 to 6, and electric roaster 3 embodying the present invention includes a base 4, an oil collecting receptacle 5 and a cover 6.

The base 4 includes a base housing 41 made of a plastic material, and a metallic rectangular first roaster tray 42 mounted on the base housing 41. The first roasted tray 42 is placed horizontally and is formed with an upwardly and laterally extending rim 421. The first roaster tray 42 further includes an oil collecting hole 422 formed adjacent one side of the rim 421, a plurality of first grooves 423 extending lengthwise within the rim 421, and partition ribs 424 each formed between two adjacent first grooves 423 to contact food. The bottom of the grooves 423 slants downward to the oil collecting hole 422 from one end to the other end of the rim 421 so that, when food is roasted on the first roaster tray 42, oil emitted from the roasted food can flow to the oil collecting hole 422 along the grooves 423. The base housing 41 includes a receiving space 411 below the oil collecting hole 422, which opens at one side of the base housing 41. A bottom support plate 412 extends into the receiving space 411 and has two engagement recesses 413 formed therein. A first heating element 43 is attached to the bottom side of the first roaster tray 42.

The oil collecting receptacle 5 is inserted removably into the receiving space 411 below the oil collecting hole 422 so as to receive the liquid flowing downward from the oil collecting hole 422. Two guide ribs 51 are formed on the bottom surface of the oil collecting receptacle 5 to engage slidably two parallel lateral edges of the bottom support plate 412. Two projections 52 project from the bottom surface of the oil collecting receptacle 5 between the guide ribs 51 to engage the engagement recesses 413 of the bottom support plate 412. As such, the oil collecting receptacle 5 is mounted slidably on the base housing 41 below the first roaster tray 42 and can be drawn out for removal of the liquid collected in the receptacle 5 or pushed into the receiving space 411 for repositioning.

Figure 5:
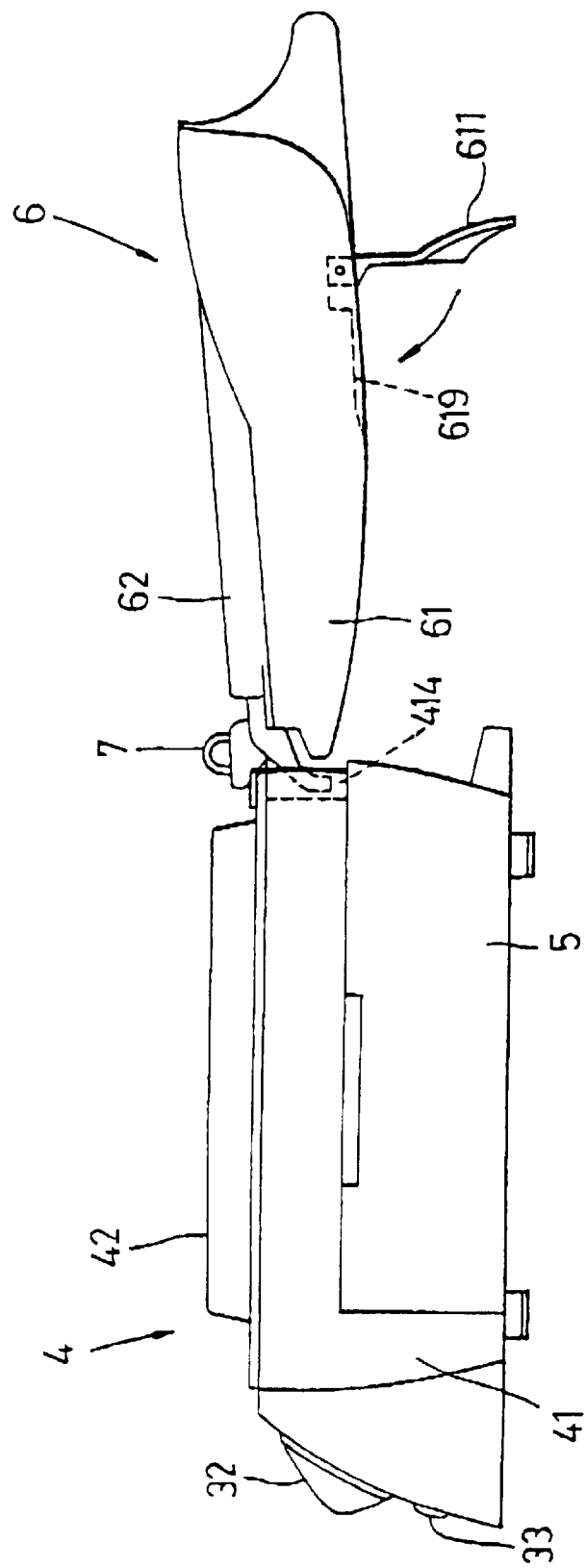
FIG. 5 is a side elevation view of the electric roaster of FIG. 2.
Figure 6:
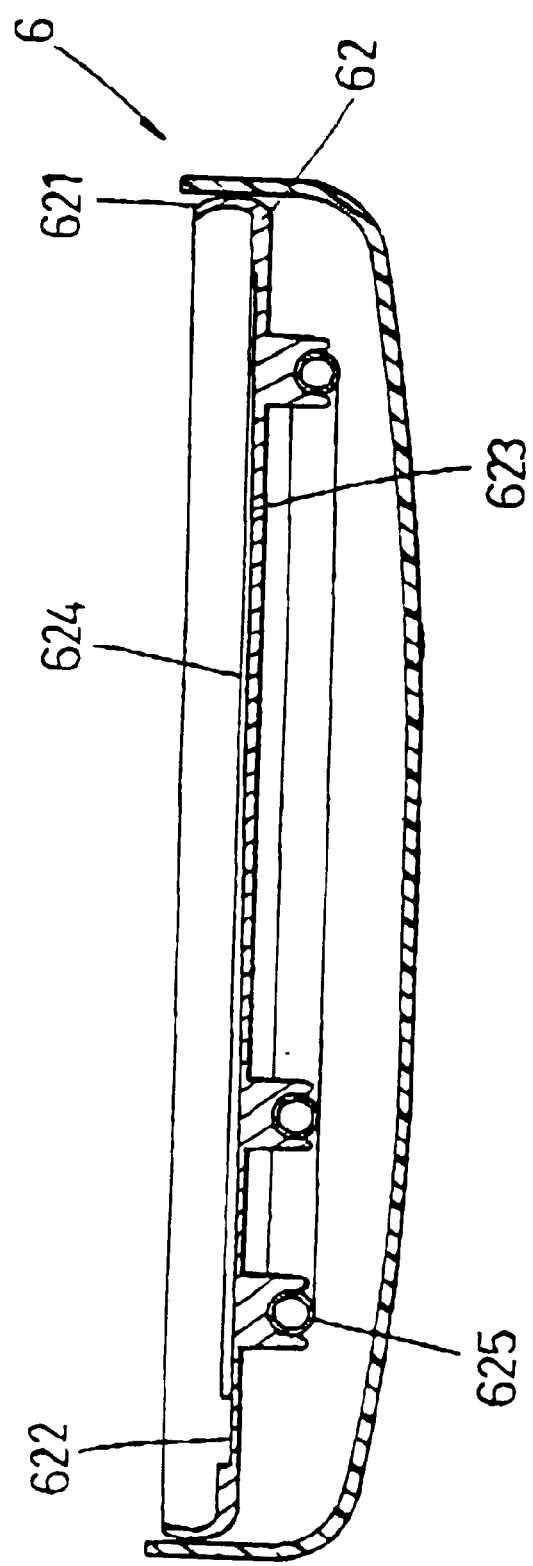
FIG. 6 is a sectional view taken along line VI—VI of FIG. 3.

The cover 6 includes a plastic cover housing 61 and a metallic rectangular second roaster tray 62 disposed on the cover housing 61. The second roaster tray 62 is connected pivotally to the first roaster tray 42 via a pivot mechanism 7 so that the second roaster tray 62 can be turned toward the first roaster tray 42 for engagement therewith or away from the first roaster tray 42. A leg 611 is disposed on the cover housing 61 remote from the base housing 41 to prop up the cover housing 61 so that the angle between the first and second roaster trays 42 and 62 is smaller than 180° and the second roaster tray 62 is inclined with respect to a horizontal plane. When the first and second roaster trays 42 and 62 are closed, the leg 611 can be folded to be stored in a recess 619 formed in the outer surface of the cover housing 61, as best shown in FIG. 5.

The second tray 62 further includes an upward rim 621, an indented part 622, and a plurality of parallel second grooves 623. When the cover 6 is turned away from the base 4 and is supported by the leg 611 as shown in FIG. 5, the cover 6 is inclined slightly downward in a direction toward the base 4, and the indented part 622 is slanted downward along a direction from one side of the second roaster tray 62 adjacent to the base housing 41 from the other side remote from the base housing 41. Ribs 624 are formed between adjacent second grooves 623 of the second roaster tray 62 to contact food. The second grooves 623 slant toward the indented part 622 along lines parallel to the direction in which the first grooves 423 slant downward. A spout 63 extends from the rim 621 adjacent a notch 626 and communicated with the indented part 622 toward the base housing 41. The spout 63 has a lower end extending into an opening 414 disposed in a wall of the base housing 41 above the oil collecting receptacle 5. As such, the liquids, such as oil and water, emitted from the food roasted on the second roaster tray 62 can flow along the second grooves 623 and the indented part 622 to the spout 63 and into the oil collecting receptacle 5. The oil collecting receptacle 5 can be drawn out of the base housing 41 for removing of the liquid collected therein and for cleaning of the receptacle 5.

When the base housing 41 is closed by the cover housing 61, the rim 421 of the first roaster tray 42 is surrounded by the rim 621 of the second roaster tray 62, and an enclose heating space is confined between the first and second roaster trays 42 and 62. In this embodiment, a second heating element 625 is attached to the second roaster tray 62 at the bottom side thereof so that the second roaster tray 62 can also be used for heating and roasting food when the base and cover housing 41 and 61 are in an open position thereof. A timing device 32 and an indicator lamp 33 are mounted on the base housing 41.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modification and equivalent arrangements.

What I claim is:

1. An electric roaster comprising:

a base housing including a first roaster tray mounted thereon, and a first heating element attached to a bottom side of said first roaster tray, said first roaster tray including a surface slanting downward in a first direction from one end to the other end of said first roaster tray, and an oil collecting hole formed in said first roaster tray adjacent to said other end of said first roaster tray;

a collecting receptacle disposed in said base housing below said oil collecting hole; and a cover housing including a second roaster tray mounted therein, one of said cover housing and said second roaster tray being connected pivotally to one of said base housing and said first roaster tray so that said first roaster tray is covered by said second roaster tray when said cover housing is turned to cover said base housing, said second roaster tray including a surface slanting downward in a second direction parallel to said first direction from one end to the other end of said second roaster tray, an indented part disposed adjacent said other end of said second roaster tray, and an oil spout communicated with said indented part and extending into said base housing to communicate with said collecting receptacle.

2. The electric roaster as claimed in claim 1, wherein said second roaster tray further includes a second heating element attached thereto.

3. The electric roaster as claimed in claim 2, wherein said first roaster tray further includes in said surface of said first roaster tray a plurality of first grooves which extend in said first direction and which slant downward in said first direction to said oil collecting hole.

4. The electric roaster as claimed in claim 3, wherein said second roaster tray further includes in said further of said second roaster tray a plurality of second grooves which extend in said second direction and slant downward in said second direction to communicate with said indented part.

5. The electric roaster as claimed in claim 4, wherein said intended part slanting downward to said oil spout along a third direction transverse to said direction.

6. The electric roaster as claimed in claim 5, wherein said cover housing is further provided with a leg remote from said base housing to prop up said cover housing when said cover housing is turned away from said base housing.

7. The electric roaster is claimed in claim 6, wherein said base housing further includes a receiving space below said first roaster tray, said receiving space opening at said other end of said first roaster tray below said first roaster tray, said collecting receptacle being received slidably and removably in said receiving space.

8. An electric roaster comprising:

a base housing;

a heated first roaster tray mounted on said base housing;

a collecting receptacle in said base housing;

said first roaster tray having a portion open to said collecting receptacle;

a cover housing including a second roaster tray mounted therein, one of said cover housing and said second roaster tray being connected pivotally to one of said base housing and said first roaster tray so that said first roaster tray is covered by said second roaster tray when said cover housing is turned to cover said base housing; and an oil spout extending from said cover housing into said base housing that provides a passage for to flow from said cover housing into said collecting receptacle when said cover housing is moved out of covering relation to said base housing.

9. The electric roaster as claimed in claim 8, wherein a first heating element for heating said first roaster tray is mounted in said base housing.

10. The electric roaster as claimed in claim 9 wherein said first heating element is attached to said first tray.

11. The electric roaster as claimed in claim 9, wherein a second heating element for heating said second roaster tray is mounted in said cover housing.

12. The electric roaster as claimed in claim 11, wherein said second heating element is attached to said second tray.

13. The electric roaster as claimed in claim 8, wherein said first roaster tray further includes a surface which slants downward toward said collecting receptacle.

14. The electric roaster as defined in claim 8 wherein said first roaster tray comprises a first plurality of oil-carrying grooves with slant downwardly toward said collecting receptacle.

15. The electric roaster as claimed in claim 14 wherein said second roaster tray comprises a second plurality of oil-carrying grooves for directing oil to said spout.

16. The electric roaster as claimed in claim 8, wherein said cover housing is further provided with a leg remote from said base housing to prop up said cover housing when said cover housing is turned away from said base housing.

17. The electric roaster as claimed in claim 8, wherein said base housing further includes a receiving space below said first roaster tray, said receiving space opening below said first roaster tray, said collecting receptacle being receive slidably and removably in said receiving space.

* * * * *